United States Patent
Gólcz

(12) 
(10) Patent No.: US 6,224,772 B1
(45) Date of Patent: *May 1, 2001

(54) ACTIVATED SLUDGE DEGASSING PROCESS AND DEVICE

(76) Inventor: Andrzej Gólcz, ul. Robotnicza 55/10, 82-300 Elblag (PL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/836,384

(22) PCT Filed: Nov. 9, 1994

(86) PCT No.: PCT/PL94/00019

§ 371 Date: Jun. 30, 1997

§ 102(e) Date: Jun. 30, 1997

(87) PCT Pub. No.: WO96/14912

PCT Pub. Date: May 23, 1996

(51) Int. Cl.$^7$ ................................. C02F 1/20; C02F 3/12
(52) U.S. Cl. ................. 210/626; 210/629; 210/188; 210/195.3; 210/219; 210/220; 210/532.1
(58) Field of Search ...................... 210/525, 527, 210/188, 197, 195.1, 195.3, 800, 805, 625, 623, 626, 629, 150, 151, 631, 532.1, 219, 220

(56) References Cited

U.S. PATENT DOCUMENTS

| | | | |
|---|---|---|---|
| 2,168,264 | * | 8/1939 | Marshall ............................ 210/527 |
| 3,669,271 | * | 6/1972 | McGivern ......................... 210/527 |
| 3,735,870 | * | 5/1973 | Uden ................................. 210/527 |
| 3,772,187 | * | 11/1973 | Othmer . |
| 3,788,476 | * | 1/1974 | Othmer . |
| 3,840,216 | * | 10/1974 | Smith et al. . |
| 4,002,440 | * | 1/1977 | Saari . |
| 4,144,174 | * | 3/1979 | Graham et al. ..................... 210/527 |
| 4,175,041 | * | 11/1979 | Drnevich et al. ................... 210/188 |
| 4,216,089 | * | 8/1980 | Boon et al. . |
| 4,263,143 | * | 4/1981 | Ebner et al. ........................ 210/629 |
| 4,276,165 | * | 6/1981 | Chamberlain .................... 210/242.1 |
| 4,512,784 | | 4/1985 | De Loach ............................ 55/196 |
| 4,629,565 | * | 12/1986 | Hell et al. ........................... 210/607 |
| 4,659,347 | * | 4/1987 | Schrems . |
| 4,871,450 | * | 10/1989 | Goodrich et al. ................... 210/151 |
| 5,185,079 | * | 2/1993 | Dague ................................ 210/603 |
| 5,441,634 | * | 8/1995 | Edwards ............................ 210/194 |
| 5,447,629 | * | 9/1995 | Chaumont et al. ................ 210/150 |
| 5,540,847 | * | 7/1996 | Stultz et al. ........................ 210/750 |

FOREIGN PATENT DOCUMENTS

| | | |
|---|---|---|
| 0 003 548 | 8/1979 | (EP) . |
| 2013095 | 8/1979 | (GB) . |
| 2016947 | 10/1979 | (GB) . |

OTHER PUBLICATIONS

Yutaka, O., "Continuous Vacuum Degassing Apparatus for Molten Copper," *Patent Abstrats of Japan* 13(*399*):Abstract of JP Publication No. 1142016 (Sep. 5, 1989).

* cited by examiner

*Primary Examiner*—Robert Popovics
(74) *Attorney, Agent, or Firm*—Sterne, Kessler, Goldstein & Fox P.L.L.C.

(57) ABSTRACT

A waste water purification process, in particular a continuous waste water purification process is disclosed, as well as a waste water purification plant system, in particular for continuous waste water purification. Waste water is purified in that an aerated mixture of waste water with activated sludge is degassed before being discharged into the secondary settling basin. The waste water purification system has a venting device that connects the aerating container or a separate chamber thereof to the secondary settling basin or a separated chamber thereof. The venting device is designed as a U-shaped tube. One of its branches forms the supply collecting pipe and the second branch forms the discharge collecting pipe, whereas the section that interconnects its two top ends delimits the intermediate chamber that contains a separate gas suction chamber.

9 Claims, 2 Drawing Sheets

ACTIVATED SLUDGE DEGASSING PROCESS AND DEVICE

BACKGROUND OF THE INVENTION

1. Field of the Invention

The present invention relates to a waste water continuous purification process, as well as to a waste water continuous purification plant system.

2. Related Art

Known waste water purification processes use active sludge. The mixture of the active sludge is held in suspension in the treated wastes and aerated. After leaving the aeration tanks the aerated mixture is directed to a secondary sedimentation tank in which sedimentation is continued by sludge precipitation. The precipitated sludge is used once more in the purification process, and the decanted liquid directed to a receptacle as the cleaned waste water. The active sludge recirculated in the purification process maintains its ability to clean new quantities of raw wastes which are introduced continuously or in batches.

Purification processes of this kind, especially if carried out in aeration chambers formed as deep tanks (e.g. deeper than 5 m), or in multi-storey processes, have certain disadvantages. Because active sludge has a relatively low sedimentation capacity, coupled with the disadvantageous feature of sludge flocs coming up to the surface during the purification process, it is virtually impossible to carry out the sedimentation in the secondary sedimentation tank.

In order to eliminate this effect, existing waste treatment processes use an additional operation consisting of flocculating and mixing the aerated wastes before their flow into the sedimentation tank. However, this causes the treatment process to be lengthy, and to frequently run in a chimerical fashion.

Flocs of the active sludge generated during the known waste treatment processes have undesirable features resulting in limited effectiveness and capacity of these processes.

SUMMARY OF THE INVENTION

In accordance with a preferred embodiment of the invention, there is provided a waste water purification process, comprising the steps of:

(a) mixing waste water together with active sludge;

(b) aerating the resultant mixture in a tank;

(c) discharging the aerated mixture into a secondary sedimentation tank while degassing; and (d) recovering the sludge in said secondary tank, wherein said recovered sludge in step (d) is recirculated as active sludge in step (a), and wherein said aerated mixture of waste in step (b) is brought into a state of turbulent flow directly before being vacuum degassed and before being discharged into said secondary sedimentation tank.

In accordance with another preferred embodiment of the invention, there is provided a waste water purification plant system for continuous waste water treatment, comprising:

an aeration tank for aerating a mixture of wastes and active sludge, said aeration tank having a separated chamber (7);

a secondary sedimentation tank (10) having a separated chamber (8);

an inverted U-shaped pipe conduit member comprising a supply collecting pipe (2) with lower and upper ends, a discharge collecting pipe (3) with lower and upper ends, and a segment connecting the upper ends of said supply and discharging collecting pipes, said segment having a cross-section greater than that of said supply and discharging collecting pipes, wherein said lower end of supply collecting pipe (2) is submerged in said aeration tank or its separated chamber (7), and said lower end of discharge collecting pipe (3) is submerged in said secondary sedimentation tank (10) or its separated chamber (8) such that said inverted U-shaped pipe conduit member provides a one-way, recirculating connection between said aeration tank or its separated chamber (7) and said secondary sedimentation tank (10) or its separated chamber (8);

a vacuum degassing means (1) disposed within said segment of said inverted U-shaped pipe conduit member, said vacuum degassing means (1) comprising an intermediate chamber (4) having a gas suction chamber (5) contained therein; and means (6) for generating a turbulent flow of said aerated mixture of waste.

DETAILED DESCRIPTION OF THE PREFERRED EMBODIMENTS

Figure 1:
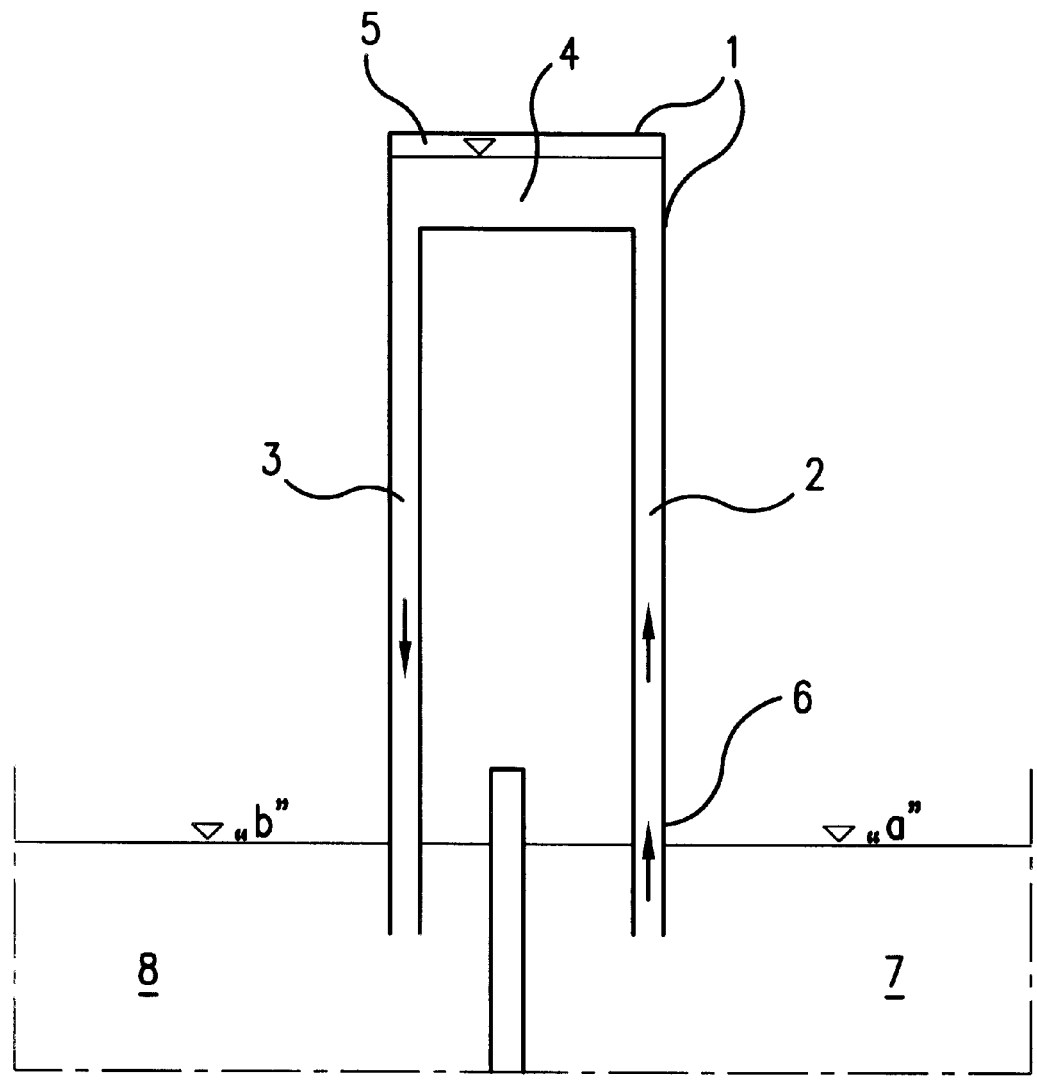
FIG. 1 represents a waste treatment device in a schematic partial view.

Flocs of the active sludge generated during the known waste treatment processes have undesirable features resulting in limited effectiveness and capacity of said processes. Based on this statement, operations and technical means have been devised according to the present invention to provide enhanced effectiveness and capacity of waste water treatment processes.

In accordance with one aspect of the present invention, there are provided new features achieved with flocs of the recovery sludge, acting as the active sludge in the recirculation process, thereby allowing an increase in the effectiveness and capacity of waste water treatment.

In accordance with a preferred embodiment of the invention, there is provided a waste water purification process, comprising the steps of:

(a) mixing waste water together with active sludge;

(b) aerating the resultant mixture in a tank;

(c) discharging the aerated mixture into a secondary sedimentation tank while degassing; and (d) recovering the sludge in said secondary tank wherein said recovered sludge in step (d) is recirculated as active sludge in step (a), and wherein said aerated mixture of waste in step (b) is brought into a state of turbulent flow directly before being vacuum degassed and before being discharged into said secondary sedimentation tank.

In one preferred embodiment, the vacuum degassing is advantageously carried out by creating negative pressure.

In one preferred embodiment, the turbulent flow is caused by supplying an additional amount of air to said mixture.

In accordance with another preferred embodiment of the invention, there is provided a waste water purification plant system for continuous waste water treatment, comprising:

an aeration tank for aerating a mixture of wastes and active sludge, said aeration tank having a separated chamber (7);

a secondary sedimentation tank (10) having a separated chamber (8);

an inverted U-shaped pipe conduit member comprising a supply collecting pipe (2) with lower and upper ends, a discharge collecting pipe (3) with lower and upper ends, and a segment connecting the upper ends of said supply and discharging collecting pipes, said segment having a cross-section greater than that of said supply and discharging collecting pipes, wherein said lower end of supply collecting pipe (2) is submerged in said aeration tank or its separated chamber (7), and said lower end of discharge collecting pipe (3) is submerged in said secondary sedimentation tank (10) or its separated chamber (8) such that said inverted U-shaped pipe conduit member provides a one-way, recirculating connection between said aeration tank or its separated chamber (7) and said secondary sedimentation tank (10) or its separated chamber (8);

a vacuum degassing means (1) disposed within said segment of said inverted U-shaped pipe conduit member, said vacuum degassing means (1) comprising an intermediate chamber (4) having a gas suction chamber (5) contained therein; and means (6) for generating a turbulent flow of said aerated mixture of waste.

It has been determined that the active sludge gathered in the secondary tank, after being vacuum outgassed, and directed once more to the aeration process as the recovery sludge, is characterised by an increased absorbing capacity for contamination in wastes to be treated. This substantially accelerates the treatment of wastes and also provides for binding to phosphorus contamination.

It has also been determined that said active sludge has a higher resistance to sudden overloading by contamination.

Figure 2:
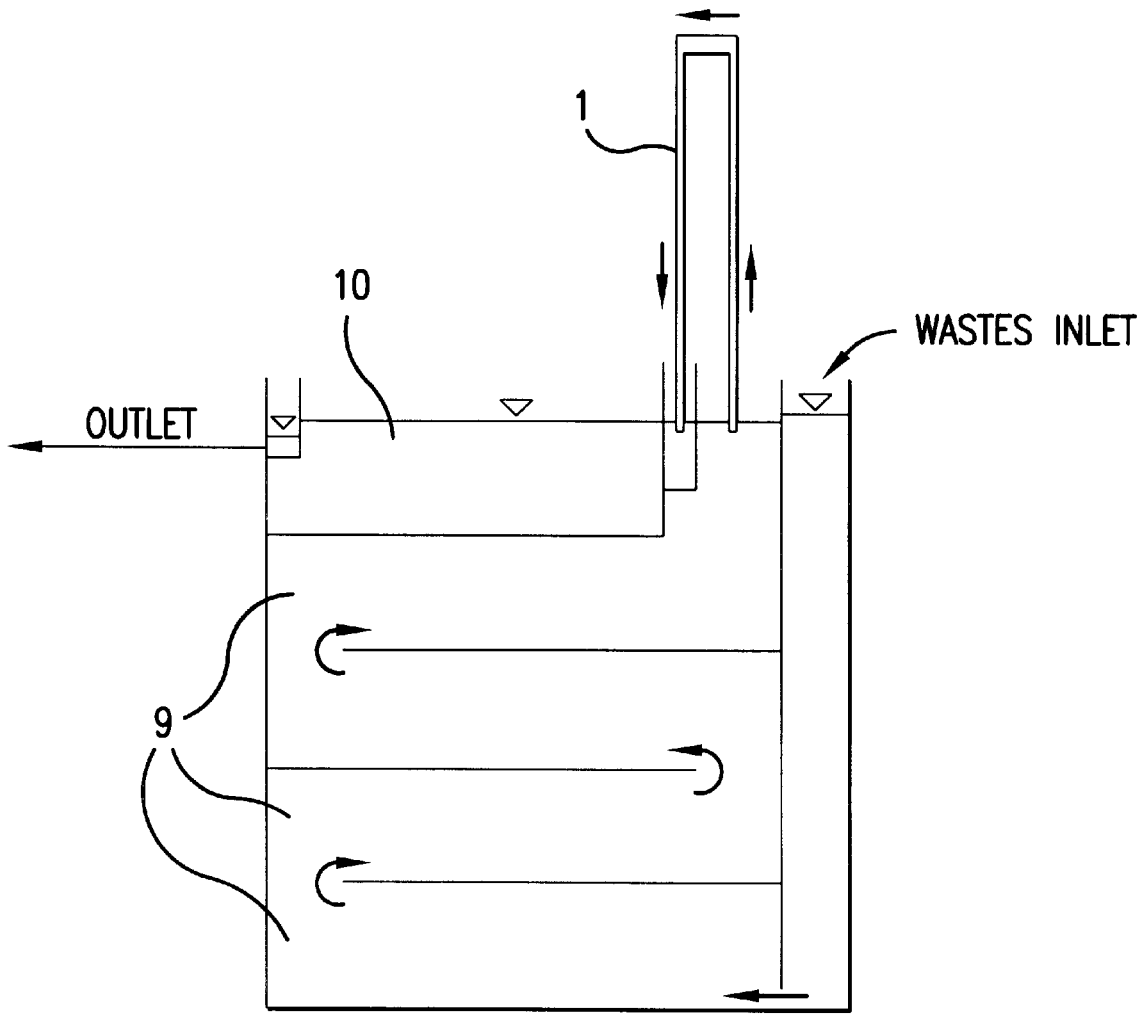
FIG. 2 represents the same device used in a waste treatment plant arrangement having a multi-storey tank.

The invention will be described in more detail in its embodiments shown in the drawings. FIG. 1 represents a waste treatment device in a schematic partial view. FIG. 2 represents the same device used in a waste treatment plant arrangement having a multi-storey tank.

Venting device 1 comprises an inverted U-shaped pipe conduit member comprising a supply collecting pipe (2) with lower and upper ends, a discharge collecting pipe (3) with lower and upper ends, and a segment connecting the upper ends of said supply and discharging collecting pipes, said segment having a cross-section greater than that of said supply and discharging collecting pipes, wherein said lower end of supply collecting pipe (2) is submerged in said aeration tank or its separated chamber (7), and said lower end of discharge collecting pipe (3) is submerged in said secondary sedimentation tank (10) or its separated chamber (8) such that said inverted U-shaped pipe conduit member provides a one-way, recirculating connection between said aeration tank or its separated chamber (7) and said secondary sedimentation tank (10) or its separated chamber (8). (FIG. 1).

The supply collecting pipe 2 is provided with an opening 6 located above the "a" level of the waste water to be aerated, filling the waste water tank or the chamber 7 separated in it.

The gas suction chamber 5 is connected to a vacuum source, e.g. a vacuum pump not shown in the drawings.

In FIG. 2 there is shown the venting device 1 located between the last uppermost chamber 9 in the multi-storey system for aerating the active sludge in the waste water to be treated, and the secondary sedimentation tank 10.

The movement and the turbulent flow of the formerly aerated mixture of waste water and active sludge is forced in the described venting device 1 by causing an additional quantity of air to flow through the opening 6 located above the level of the liquid filling the chamber 7 of the aeration tank. A mammoth pump may be used in order to achieve that flow. The additionally introduced quantity of air is vacuumed together with gases contained in that mixture, thereby causing the required reduction in the specific gravity of the mixture.

EXAMPLE

Waste water having a contamination load of 30 kg $O_2$ per hour, and introduced in a quantity of 100 $m^3$/h into a typical municipal wastes purification plant, comprising a container for the mixture consisted of wastes and active sludge, was effectively and efficiently treated. The active sludge sedimentation capacity has been substantially increased by installing the venting device according to the present invention, thus making it possible to increase the sludge quantity in the treatment system. This achieves an effective and efficient waste water treatment process with a capacity at least 50% greater without the necessity of using additional aeration tanks.

This effect is achieved after venting the previously aerated mixture consisting of wastes and active sludge under vacuum conditions by the venting device of the present invention. Because of surrounding micro-bubbles of gas present in the flocks of active sludge, the flocs are freed of that gas which, in the above mentioned vacuum conditions, expands to many times its volume. As a result the micro-bubbles are disconnected from a floc while its flocculate structure is almost entirely degraded. Afterwards, during the further flow through the venting device, under conditions of a gradually decreasing negative pressure value, individual sludge flocs attain a much greater specific gravity after the venting operation. As a result, the sedimentation capacity of the sludge flocs is substantially increased and they quickly rebound together.

Thus, one may advantageously treat substantially more process quantities of filiform micro-organisms comprised in the sludge without disturbing the sludge sedimentation capacity. This cannot be achieved by using the known processes.

Furthermore, active sludge flocs produce, as a result of intrafloccule processes during degassing, a gas that does not create microbubbles in a sludge floc, but which is instead dissolved in a previously outgassed mixture.

What is claimed is:

1. A waste water purification process, comprising the steps of:
    (a) mixing waste water together with active sludge;
    (b) aerating the resultant mixture in a tank;
    (c) discharging the aerated mixture into a secondary sedimentation tank while vacuum degassing, thereby producing active sludge; and
    (d) recovering the active sludge in said secondary tank, wherein said recovered active sludge in step (d) is recirculated in step (a), and wherein said aerated mixture of waste in step (b) is brought into a state of turbulent flow directly before being vacuum degassed and before being discharged into said secondary sedimentation tank.

2. A waste water purification process according to claim 1, wherein said turbulent flow is caused by supplying air into said mixture.

3. A waste water purification plant system for continuous waste water treatment, comprising:
    an aeration tank for aerating a mixture of wastes and active sludge, said aeration tank having a separated chamber (7);
    a secondary sedimentation tank (10) having a separated chamber (8);

an inverted U-shaped pipe conduit member comprising a supply collecting pipe (2) with lower and upper ends, a discharge collecting pipe (3) with lower and upper ends, and a segment connecting the upper ends of said supply and discharging collecting pipes, said segment having a cross-section greater than that of said supply and discharging collecting pipes, such that said inverted U-shaped pipe conduit member provides a one-way, recirculating connection between said aeration tank or its separated chamber (7) and said secondary sedimentation tank (10) or its separated chamber (8);

a vacuum degassing means (1) disposed within said segment of said inverted U-shaped pipe conduit member, said vacuum degassing means (1) comprising an intermediate chamber (4) having a gas suction chamber (5) contained therein, wherein said vacuum degassing means produces active sludge from sludge; and means for generating a turbulent flow of said aerated mixture of waste, wherein said aerated mixture of waste is supplied into said intermediate chamber (4) in a state of turbulent flow directly before being vacuum degassed to produce active sludge and before being discharged into said secondary sedimentation tank wherein said means causing said turbulent flow comprises an opening (6) in said supply collecting pipe (2) positioned between said aeration tank and said vacuum degassing means (1), said opening being located above a level (a) of wastes to be aerated, said wastes filling said secondary sedimentation tank designed for wastes to be treated or said chamber (7) separated in said tank.

4. A waste water purification plant system according to claim 3, wherein said gas suction chamber (5) is connected to a vacuum source.

5. A waste water purification plant system according to claim 4, wherein said vacuum source is a suction pump.

6. A waste water purification plant system according to claim 3, wherein said lower end of said supply collecting pipe (2) is submerged in or connected to said active sludge mixture aeration tank or its separated chamber (7), and said lower end of said discharge collecting pipe (3) is submerged in or connected to said secondary sedimentation tank (10) or its separated chamber (8).

7. A waste water purification plant system according to claim 3 or 6, wherein said means causing said turbulent flow comprises an opening (6) in said supply collecting pipe (2) positioned between said aeration tank and said vacuum degassing means (1), said opening being located above a level (a) of wastes to be aerated, said wastes filling said secondary sedimentation tank designed for wastes to be treated or said chamber (7) separated in said tank.

8. A waste water purification plant system according to claim 3 or 6, wherein said supply collecting pipe (2) has a suction and force pump.

9. A waste water purification plant system according to claim 3 or 6, wherein said discharge collecting pipe (3) has a suction and force pump.

* * * * *